W. F. BLEECKER.
TOY.
APPLICATION FILED FEB. 10, 1915.
1,175,225.
Patented Mar. 14, 1916.
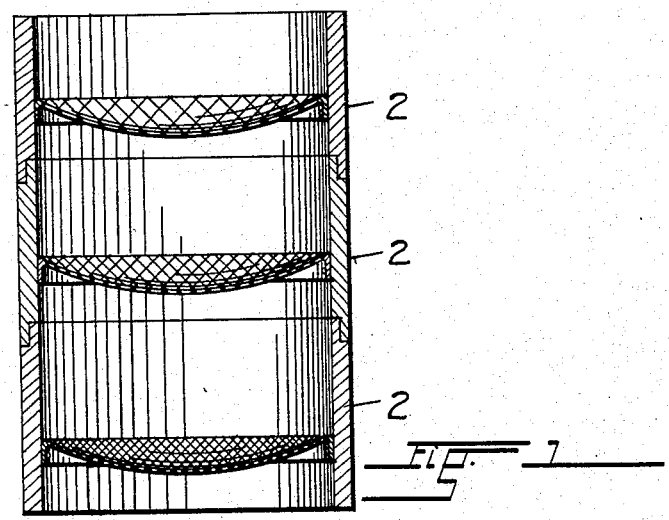
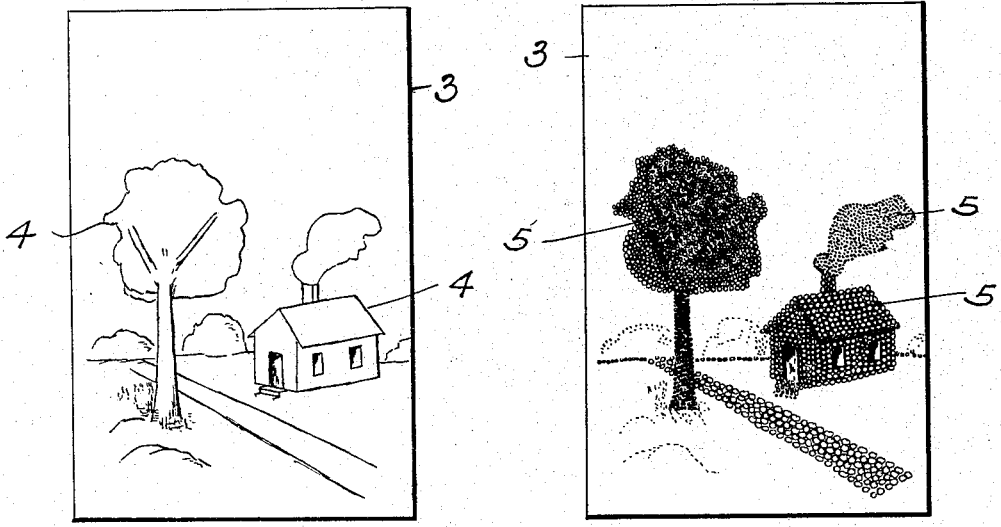
WITNESSES:
F. H. Cuno.
L. Rhoades
INVENTOR.
W. F. Bleecker.
BY
ATTORNEY.

ly, the classes into which
UNITED STATES PATENT OFFICE.

WARREN F. BLEECKER, OF CANONSBURG, PENNSYLVANIA.

TOY.

1,175,225.  Specification of Letters Patent.  Patented Mar. 14, 1916.

Application filed February 10, 1915. Serial No. 7,275.

*To all whom it may concern:*

Be it known that I, WARREN F. BLEECKER, a citizen of the United States, residing at Canonsburg, in the county of Washington and State of Pennsylvania, have invented certain new and useful Improvements in Toys, of which the following is a specification.

This invention relates to toys, and its object resides in providing a toy of novel character which will not only afford an ever varying source of diversion and entertainment to children of different ages, but which furthermore is of more than ordinary educational and instructive value.

With this object in view my invention consists of a quantity of granules made of glass or other silicious insoluble material, and preferably of spherical form. The granules are made in two or more different sizes and in correspondingly differing colors, so that by classifying the granules according to their sizes, they are also separated in accordance with their colors. Accompanying the quantities of granules is a screening device by the use of which a child may readily divide the granules in accordance with their different sizes and thereby classify the same according to their different colors. The granules are preferably made of a size approaching that or ordinary sand grains.

The number of classes of granules of different sizes contained in the quantity which constitutes the toy is optional and variable in accordance with the number of different colors it is desired to provide, it being apparent that the instructive and entertaining properties of the toy increase proportionally to the number of classes of different colors into which the granules can be divided.

In using the toy, any flat surface on which the granules can be shifted and arranged by the child is suitable, although I prefer to provide sheets of paper or other materials on which the designs to be produced in colors are printed in outline.

The child after dividing the granules into groups of different colors by classifying them according to their different sizes by the use of the screening device, arranges the granules on the sheet or other surface in accordance with either a determinate or arbitrary design. Colored pictures of every conceivable nature may thus be made by a proper selection and arrangement of quantities of the granules of different colors, beautiful color effects can be obtained by those skilled by practice, and by properly mixing the colored particles, various gradations of color may be produced.

It is well known that colors are attractive to all children and by the means above described the children are not only amused and entertained but they are at the same time unconsciously instructed in the properties of colors, the production of different shades and tints and the possibility of separating mixtures into elements.

Granules of spherical form are best adapted for the purposes hereinabove described as they are more readily classified by screening and as they are easier separated from each other while being arranged upon the pattern according to their colors.

In the accompanying drawings I have shown in Figure 1 a convenient device for use in the classification of the granules according to their sizes and colors. The reference characters 2 designate a series of screens nested one above the other in axial alinement. The mesh of the different screens decreases progressionally from the upper one to the lower one so that when a quantity of the different sized granules is placed on the upper screen and the nest is shaken by hand or is otherwise vibrated, the granules will be assorted in the different screens according to their sizes and thereby divided in accordance with their colors.

It will be understood that the screening device as shown and described is merely illustrative of a simple method by which the desired results may be obtained, and that other devices different in construction and operation may be employed within the spirit of my invention.

Fig. 2 shows a surface 3 upon which is printed a design in outline as at 4, and Fig. 3 shows the same surface after the granules which have been designated by the numeral 5 have been arranged upon the design according to their different colors.

It will be understood from the above description that inasmuch as all granules of each size are similarly colored and dissimilar colors are employed to differentiate granules of different sizes, the classes into which the granules are divided may be mixed as often as desired and again cleanly separated by the simple process of screening, thus allowing continuous use of the toy without depreciation or loss.

Having thus described my invention what I claim and desire to secure by Letters-Patent is:

1. A toy comprising a surface having designs marked thereon, and a quantity of granules of different colors to be placed over the design for forming pictures, the granules of each color differing in size from the granules of the other colors so as to permit mechanical separation of the different colors when mixed.

2. A toy comprising a surface adapted to have designs marked thereon, and a quantity of granules of different colors to be placed over a design marked on said surface, for forming pictures, the granules of each color differing in size from the granules of the other colors so as to permit mechanical separation of the different colors when mixed.

3. A toy comprising a quantity of granules of different colors to be placed upon a surface for forming pictures, the granules of each being of equal size and differing in size from the granules of the other colors so as to permit mechanical separation of the different colors when mixed.

In testimony whereof I have affixed my signature in presence of two witnesses.

WARREN F. BLEECKER.

Witnesses:
F. F. ADAMS,
H. H. MORRISON.

Copies of this patent may be obtained for five cents each, by addressing the "Commissioner of Patents, Washington, D. C."